US012617371B2

(12) United States Patent
Suzuki et al.

(10) Patent No.: US 12,617,371 B2
(45) Date of Patent: May 5, 2026

(54) WEBBING TAKE-UP DEVICE

(71) Applicant: KABUSHIKI KAISHA TOKAI-RIKA-DENKI-SEISAKUSHO, Niwa-gun (JP)

(72) Inventors: Yuta Suzuki, Aichi (JP); Yoshiteru Sakaguchi, Aichi (JP); Tomoya Yokoi, Aichi (JP); Yuta Fukuwa, Aichi (JP); Junichi Muranaka, Aichi (JP); Kengo Chujo, Aichi (JP)

(73) Assignee: KABUSHIKI KAISHA TOKAI-RIKA-DENKI-SEISAKUSHO, Niwa-gun (JP)

( * ) Notice: Subject to any disclaimer, the term of this patent is extended or adjusted under 35 U.S.C. 154(b) by 51 days.

(21) Appl. No.: 18/672,413

(22) Filed: May 23, 2024

(65) Prior Publication Data

US 2024/0399994 A1    Dec. 5, 2024

(30) Foreign Application Priority Data

May 30, 2023    (JP) ................................. 2023-088904

(51) Int. Cl.
*B60R 22/46*          (2006.01)
(52) U.S. Cl.
CPC ................................ *B60R 22/4633* (2013.01)
(58) Field of Classification Search
CPC . A44B 11/2546; A44B 11/2569; B60R 22/28; B60R 22/34; B60R 22/343; B60R 22/46; B60R 22/4604; B60R 22/4628; B60R 22/4633; B60R 22/4676; B60R 2022/286; B60R 2022/287; B60R 2022/4638; B60R 2022/4642; B60R 2022/4647; B60R 2022/468

USPC ........................................................ 242/370
See application file for complete search history.

(56) References Cited

U.S. PATENT DOCUMENTS

| | | | | |
|---|---|---|---|---|
| 10,266,147 | B2 * | 4/2019 | Sakaguchi | .......... B60R 22/4628 |
| 10,744,975 | B2 * | 8/2020 | Yanagawa | ............... B60R 22/34 |
| 10,919,488 | B2 * | 2/2021 | Yanagawa | ............... B60R 22/46 |
| 11,001,226 | B2 * | 5/2021 | Yanagawa | .......... B60R 22/4628 |
| 11,007,975 | B2 * | 5/2021 | Tanaka | ................ B60R 22/4676 |
| 11,014,531 | B2 * | 5/2021 | Mödinger | ............... B60R 22/46 |
| 11,904,798 | B2 * | 2/2024 | Uchibori | ............. B60R 22/4628 |
| 11,964,626 | B2 * | 4/2024 | Watanabe | ............... B60R 22/46 |
| 12,139,099 | B2 * | 11/2024 | Yokoyama | ........... B60R 22/343 |
| 12,269,418 | B2 * | 4/2025 | Uchibori | ............. B60R 22/4633 |
| 2018/0178752 | A1 | 6/2018 | Yoshioka | |

(Continued)

FOREIGN PATENT DOCUMENTS

| | | | | | |
|---|---|---|---|---|---|
| DE | 102010051463 A1 * | 5/2012 | ......... B60R 22/4628 |
| DE | 102016118467 A1 * | 3/2018 | ......... B60R 22/4633 |

(Continued)

*Primary Examiner* — Joshua E Rodden
(74) *Attorney, Agent, or Firm* — Dority & Manning, PA

(57) ABSTRACT

In a pipe, a first corner portion, a second corner portion, and a third corner portion are formed sequentially from a guide direction upstream stream as a result of an axial direction intermediate portion of the pipe being bent in three places. The first corner portion and the second corner portion are bent in a substantially identical plane, and the third corner portion is bent in a direction deviating from the substantially identical plane. The radius of curvature of the third corner portion is set larger than the radius of curvature of the first corner portion.

8 Claims, 6 Drawing Sheets

(56)  References Cited

U.S. PATENT DOCUMENTS

| | | | | |
|---|---|---|---|---|
| 2020/0231115 A1* | 7/2020 | Tanaka | ................ | B60R 22/4633 |
| 2020/0384946 A1* | 12/2020 | Tanaka | ................ | B60R 22/4628 |
| 2021/0114549 A1* | 4/2021 | Yanagawa | ........... | B60R 22/4628 |
| 2021/0354656 A1* | 11/2021 | Wang | .................. | B60R 22/1955 |
| 2023/0192028 A1* | 6/2023 | Uchibori | ................. | B60R 22/38 |
| | | | | 242/396.1 |
| 2023/0219520 A1* | 7/2023 | Yokoi | ................. | B60R 22/4676 |
| | | | | 242/396.1 |
| 2023/0331186 A1* | 10/2023 | Uchibori | ................. | B60R 22/46 |
| 2023/0356689 A1* | 11/2023 | Uchibori | ............. | B60R 22/4628 |

FOREIGN PATENT DOCUMENTS

| | | | | |
|---|---|---|---|---|
| JP | 2018103947 | 7/2018 | | |
| WO | WO-2014087721 A1 * | 6/2014 | ........ | B60R 22/4628 |
| WO | WO-2022102261 A1 * | 5/2022 | ............ | B60R 22/46 |

* cited by examiner

FIG.3

WEBBING TAKE-UP DEVICE

CROSS-REFERENCE TO RELATED APPLICATION

This application claims priority under 35 USC 119 from Japanese Patent Application No. 2023-088904 filed on May 30, 2023, the disclosure of which is incorporated by reference herein in its entirety.

BACKGROUND

Technical Field

The present disclosure relates to a webbing take-up device where a spool is rotated in a take-up direction as a result of a moving member that is elongated and made of resin being moved to an axial direction distal end side.

Related Art

Japanese Patent Application Laid-open (JP-A) No. 2018-103947 discloses a retractor where, at the time of an emergency, a plastically deformable elongated resin component is guided in a pipe and pushed out from the pipe, whereby a spool is rotated and a webbing is taken up onto the spool. The pipe is bent in a substantially U shape in plan view on the upper side of a base frame and is further bent downward, thereby ensuring length for the pipe.

Here, in this retractor, sliding loss occurs because the elongated resin component passes through a corner portion inside the pipe, and there is room for improvement in terms of reducing sliding loss when the elongated resin component moves.

SUMMARY

In consideration of the above circumstances, the present disclosure obtains a webbing take-up device that can reduce sliding loss when a moving member that is elongated and made of resin is guided and moves in a guide member.

A webbing take-up device of a first aspect of the disclosure includes: a spool onto which a webbing of a seat belt device is taken up due to the spool being rotated in a take-up direction; a rotating member that is provided with biting portions, the spool being rotated in the take-up direction due to the rotating member being rotated to one side; a moving member that is made of resin, that is formed in an elongated shape, and that causes the rotating member to rotate to the one side due to the moving member being moved to a distal end side in an axial direction of the moving member and the biting portions biting the moving member; and a guide member that is formed in a tubular shape, and that guides movement of the moving member, an intermediate portion in an axial direction of the guide member being bent in three places such that a first corner portion, a second corner portion, and a third corner portion sequentially from an upstream side toward a downstream side in a guide direction are formed, wherein: the first corner portion and the second corner portion are bent on a substantially identical plane, and the third corner portion is bent in a direction deviating from the substantially identical plane, and a radius of curvature of the third corner portion is set larger than a radius of curvature of the first corner portion.

A webbing take-up device of a second aspect of the disclosure includes: a spool onto which a webbing of a seat belt device is taken up due to the spool being rotated in a take-up direction; a rotating member that is provided with biting portions, the spool being rotated in the take-up direction due to the rotating member being rotated to one side; a moving member that is made of resin, that is formed in an elongated shape, and that causes the rotating member to rotate to the one side due to the moving member being moved to a distal end side in an axial direction of the moving member and the biting portions biting the moving member; and a guide member that is formed in a tubular shape, and that guides movement of the moving member, an intermediate portion in an axial direction of the guide member being bent in three places such that a first corner portion, a second corner portion, and a third corner portion sequentially from an upstream side toward a downstream side in a guide direction are formed, wherein: the first corner portion and the second corner portion are bent on a substantially identical plane, and the third corner portion is bent in a direction deviating from the substantially identical plane, and a radius of curvature of the second corner portion is set larger than a radius of curvature of the first corner portion.

A webbing take-up device of a third aspect of the disclosure is the webbing take-up device of the first aspect of the disclosure, wherein the radius of curvature of the second corner portion is equal to or larger than the radius of curvature of the first corner portion, and a radius of curvature of the third corner portion is set larger than the radius of curvature of the second corner portion.

A webbing take-up device of a fourth aspect of the disclosure is the webbing take-up device of any one of the first to third aspects of the disclosure, wherein the guide member is set so that, as viewed in a direction in which the third corner portion and the second corner portion are connected, an angle formed by a first extension portion linearly extending from a first corner portion side to a second corner portion side and a second extension portion linearly extending from a third corner portion side to the downstream side in the guide direction is an acute angle.

In the webbing take-up device of the first aspect of the disclosure, the moving member that is elongated and made of resin is moved to an axial direction distal end side while being guided in the tubular guide member and the biting portions of the rotating member bite into the moving member, due thereto, the moving member causes the rotating member to rotate to the one side so that the spool is rotated in the take-up direction. For this reason, the webbing of the seat belt device is taken up onto the spool. Furthermore, in the guide member, the first corner portion, the second corner portion, and the third corner portion are formed sequentially from the guide direction upstream side to the guide direction downstream side as a result of the axial direction intermediate portion of the guide member being bent in three places, with the first corner portion and the second corner portion being bent in the substantially identical plane and the third corner portion being bent in the direction deviating from the substantially identical plane. For this reason, in the moving member passing through the third corner portion, a portion different from the portions which are bending-deformed by the first corner portion and the second corner portion becomes bending-deformed.

Here, the radius of curvature of the third corner portion is set larger than the radius of curvature of the first corner portion. For this reason, even if there is a portion that becomes newly bending-deformed in the moving member passing through the third corner portion, deceleration caused by being bending-deformed of that portion is suppressed because that portion is gently bending-deformed. As a result, sliding loss when the moving member that is elongated and made of resin is guided and moves in the guide member can be reduced.

In the webbing take-up device of the second aspect of the disclosure, the moving member that is elongated and made of resin is moved to an axial direction distal end side while being guided in the tubular guide member and the biting portions of the rotating member bite into the moving member, due thereto, the moving member causes the rotating member to rotate to the one side so that the spool is rotated in the take-up direction. For this reason, the webbing of the seat belt device is taken up onto the spool. Furthermore, in the guide member, the first corner portion, the second corner portion, and the third corner portion are formed sequentially from the guide direction upstream side to the guide direction downstream side as a result of the axial direction intermediate portion of the guide member being bent in three places, with the first corner portion and the second corner portion being bent in the substantially identical plane and the third corner portion being bent in the direction deviating from the substantially identical plane. For this reason, in the moving member passing through the third corner portion, a portion different from the portions bending-deformed by the first corner portion and the second corner portion becomes bending-deformed, and a force that pushes part of the moving member against the outer peripheral side inner surface of the second corner portion acts due to deceleration of the moving member at that time.

Here, the radius of curvature of the second corner portion is set larger than the radius of curvature of the first corner portion. For this reason, even if the force that pushes part of the moving member against the outer peripheral side inner surface of the second corner portion acts due to deceleration of the moving member passing through the third corner portion, sliding resistance caused by that force is suppressed. As a result, sliding loss when the moving member that is elongated and made of resin is guided and moves in the guide member can be reduced.

In the webbing take-up device of the third aspect of the disclosure, the radius of curvature of the second corner portion is equal to or larger than the radius of curvature of the first corner portion. For this reason, even if the force that pushes part of the moving member against the outer peripheral side inner surface of the second corner portion acts due to deceleration of the moving member passing through the third corner portion, sliding resistance is suppressed compared with a case where the radius of curvature of the second corner portion is set smaller than the radius of curvature of the first corner portion. Moreover, the radius of curvature of the third corner portion is set larger than the radius of curvature of the second corner portion. For this reason, deceleration of the moving member passing through the third corner portion can be efficiently suppressed.

In the webbing take-up device of the fourth aspect of the disclosure, the guide member is set so that, as viewed in the direction in which the third corner portion and the second corner portion are connected, the angle formed by the first extension portion linearly extending from the first corner portion side to the second corner portion side and the second extension portion linearly extending from the third corner portion side to the guide direction downstream side is an acute angle. For this reason, compared with a case where the guide member is set so that the angle formed by the first extension portion and the second extension portion is a right angle for example, the amount of the portion that becomes newly bending-deformed in the moving member passing through the third corner portion can be reduced, so deceleration of the moving member passing through the third corner portion can be suppressed even more.

BRIEF DESCRIPTION OF THE DRAWINGS

FIG. 3 is an exploded perspective view showing a pipe and members disposed inside the pipe as viewed obliquely from above;

DETAILED DESCRIPTION

Figure 1:
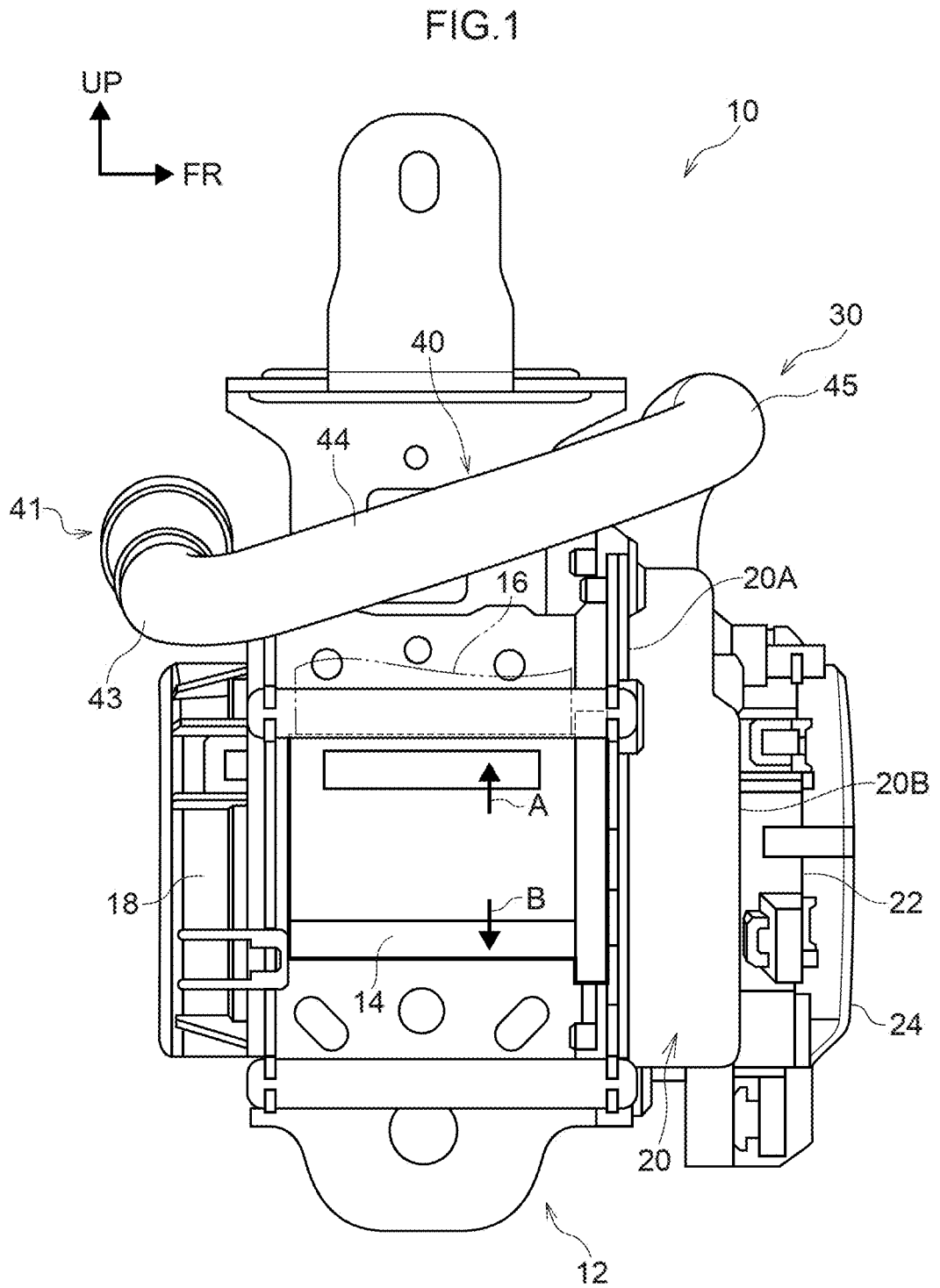
FIG. 1 is a front elevation view showing a webbing take-up device pertaining to an exemplary embodiment of the disclosure as viewed from a vehicle width direction outer side.

A webbing take-up device 10 pertaining to an exemplary embodiment of the disclosure will now be described using FIG. 1 to FIG. 5. It will be noted that, in the drawings, arrow FR indicates a forward direction of a vehicle to which the webbing take-up device 10 is applied, arrow OUT indicates an outward direction in the vehicle width direction, and arrow UP indicates the vehicle upward direction. Furthermore, in the drawings, arrow A indicates a take-up direction, which is a rotational direction of a spool 14 when the spool 14 takes up a webbing 16, and arrow B indicates a pull-out direction opposite the take-up direction.

Configuration

The webbing take-up device 10 pertaining to the present embodiment shown in FIG. 1 is part of a seat belt device for a vehicle and includes a frame 12. The frame 12 is fixed to a vehicle lower side portion of a center pillar (not shown in the drawings) serving as a vehicle body of the vehicle.

Furthermore, the frame 12 is provided with a spool 14. The spool 14 is formed in a substantially cylindrical shape and is rotatable about a central axis (the direction of arrow A and the direction of arrow B). To the spool 14 is anchored a lengthwise direction base end portion of an elongated belt-like webbing 16, and when the spool 14 is rotated in the take-up direction (the direction of arrow A), the webbing 16 is taken up from its lengthwise direction base end portion side onto the spool 14. Furthermore, a lengthwise direction distal end side of the webbing 16 extends from the spool 14 in the vehicle upward direction and is looped back in the vehicle downward direction through a slit hole formed in a through anchor (not shown in the drawings) supported on the center pillar on the vehicle upper side of the frame 12.

Moreover, the lengthwise direction distal end portion of the webbing 16 is anchored to an anchor plate (not shown in the drawings). The anchor plate is formed of a metal plate material such as iron and is fixed for example to the floor (not shown in the drawings) of the vehicle or a framework member of a seat (not shown in the drawings) corresponding to the webbing take-up device 10.

Furthermore, the seat belt device for the vehicle to which the webbing take-up device 10 is applied includes a buckle device (not shown in the drawings). The buckle device is provided on the vehicle width direction inner side of the seat (not shown in the drawings) to which the webbing take-up device 10 is applied. An occupant sitting in the seat wears the webbing 16 on his/her body by causing a tongue (not shown in the drawings) provided on the webbing 16 to engage with the buckle device in a state in which the webbing 16 has been pulled across the occupant's body.

Furthermore, as shown in FIG. 1, on the vehicle rear side of the frame 12 is provided a spring housing 18. Inside the spring housing 18 is provided a spool urging member (not shown in the drawings) such as a flat spiral spring. The spool urging member is directly or indirectly engaged with the spool 14, and the spool 14 is urged in the take-up direction (the direction of arrow A) by urging force of the spool urging member.

To the vehicle front side of the frame 12 is fixed a cover plate 20. The cover plate 20 is formed in the shape of a container that opens in the vehicle rearward direction and is provided with a flange 20A on the peripheral edge of the opening on the vehicle rear side. The cover plate 20 has a vertical wall portion 20B on the vehicle front side in which is formed a through hole (not shown in the drawings) that runs through the vertical wall portion 20B in a wide range including the central region thereof. Inside the cover plate 20 are provided part of a lock mechanism (not shown in the drawings) and part of a pretensioner 30.

A sensor holder 24 is fixed via a coupling member 22 to the vehicle front side of the cover plate 20. The main portion of the sensor holder 24 is formed in the shape of a container that opens in the vehicle rearward direction. Inside the sensor holder 24 is housed a sensor (not shown in the drawings) that detects an emergency state of the vehicle. The lock mechanism is configured to limit (restrict) rotation of the spool 14 in the pull-out direction at the time of a vehicle emergency based on the detection result of the sensor.

The pretensioner 30 is a mechanism that forcibly causes the spool 14 to rotate in the take-up direction at the time of a vehicle emergency to thereby remove slack in the webbing 16 worn on the occupant. The pretensioner 30 includes, inside the cover plate 20, a rotating member (also called a "pinion") 32 shown in FIG. 2. It will be noted that in FIG. 2 some constituent components provided inside the container-shaped portion of the cover plate 20 are simplified and represented by dashed lines. The rotating member 32 is provided so as to be integrally rotatable with the spool 14 (see FIG. 1). The outer peripheral side of the rotating member 32 is provided with plural teeth 32A serving as biting portions that are lined up in the peripheral direction. When the rotating member 32 is rotated to one side (the same direction as the direction of arrow A in FIG. 2), the spool 14 (see FIG. 1) is rotated in the take-up direction.

Furthermore, the pretensioner 30 includes a pipe (also called a "cylinder") 40 serving as a guide member formed in a tubular shape. The pipe 40 is made of metal. An axial direction base end portion 41 of the pipe 40 shown in FIG. 1 is disposed on the vehicle rear upper side of the frame 12, is formed so that its central axis is linear, and has a diameter that is set larger than other normal portion of the pipe 40. It will be noted that details about the shape of the pipe 40 other than the axial direction base end portion 41 will be described further below.

Figure 3:
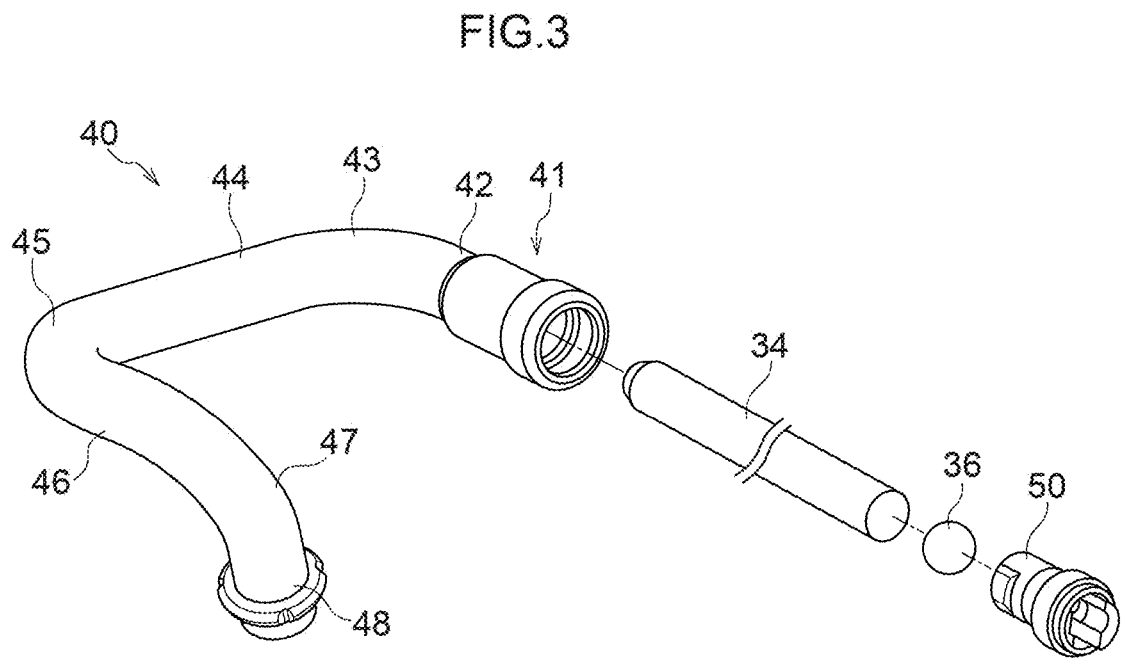

A micro gas generator 50 (hereinafter the micro gas generator 50 will be called "the MGG 50") serving as a fluid supply member shown in FIG. 3 is inserted into the axial direction base end portion 41 of the pipe 40. The MGG 50 is electrically connected via an ECU (not shown in the drawings) serving as a control unit to an impact detection sensor (not shown in the drawings) provided in the vehicle, and when a shock at the time of an impact to the vehicle is detected by the impact detection sensor, the MGG 50 is activated by the ECU and a gas that is one aspect of a fluid generated by the MGG 50 is supplied to the inside of the pipe 40.

Furthermore, a seal ball 36 and a moving member 34 are disposed inside the pipe 40. The pipe 40 is a member that guides the movement of the seal ball 36 and the moving member 34, and an axial direction distal end side (the opposite side of the axial direction base end portion 41 side) of the pipe 40 is a guide direction downstream side and is fixed in a state in which it is inserted into the upper portion of the cover plate 20 on the vehicle width direction inner side shown in FIG. 2. The seal ball 36 shown in FIG. 3 is an element that can be understood as a piston, is made of resin, and is formed so as to receive the gas supplied from the MGG 50 and slide through, while sealing, the inner surface of the pipe 40. The moving member 34 is made of resin, is formed in an elongated shape, and is deformable upon receiving an external force. It will be noted that the moving member 34 may also be called a resin rack.

Figure 2:
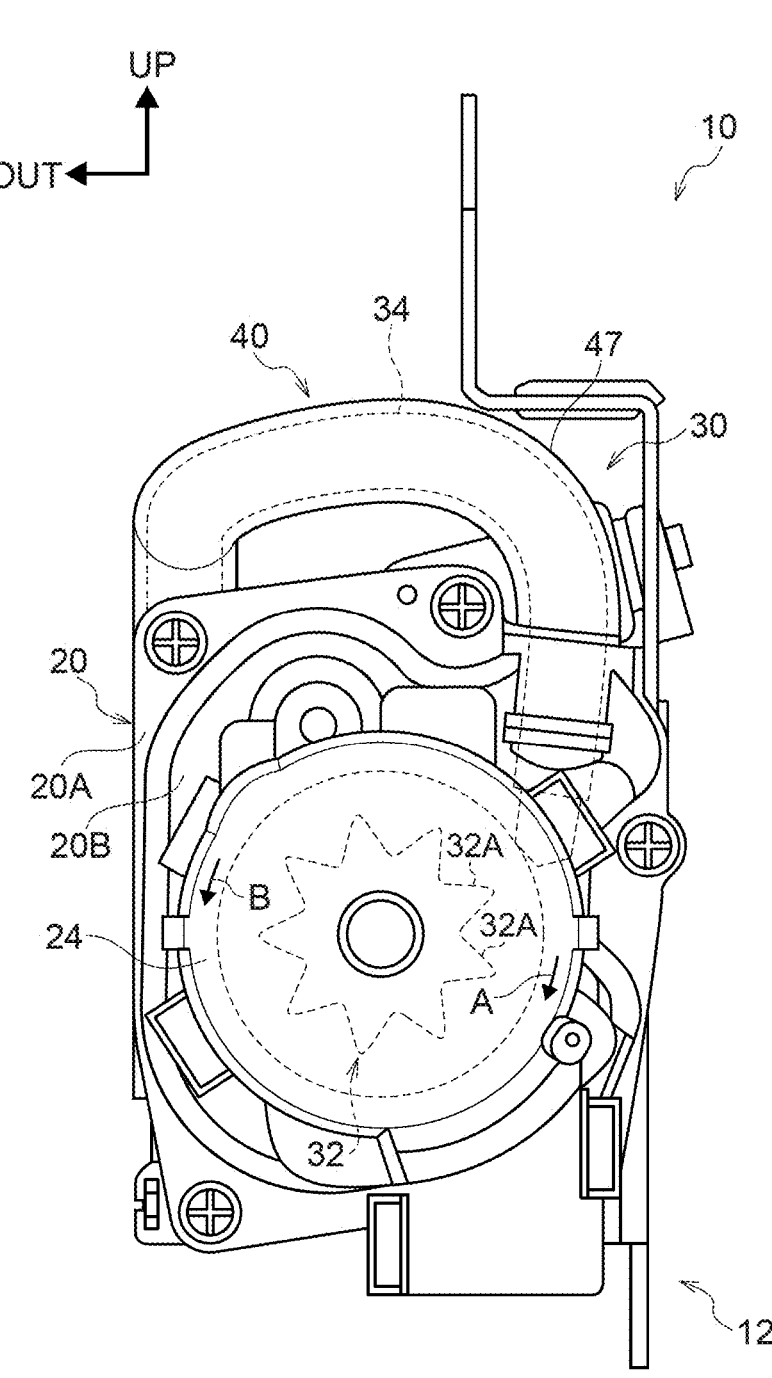
FIG. 2 is a side view showing the webbing take-up device of FIG. 1 as viewed from a vehicle front side.

The moving member 34 is disposed on the opposite side of the MGG 50 side relative to the seal ball 36 inside the pipe 40. When the seal ball 36 is moved to the guide direction downstream side while being guided in the pipe 40, the moving member 34 is pushed by the seal ball 36 and moved to the guide direction downstream side while being guided in the pipe 40. When the moving member 34 shown in FIG. 2 is moved to the axial direction distal end side and the teeth 32A of the rotating member 32 bite into it, the moving member 34 causes the rotating member 32 to rotate to the one side (the same direction as the direction of arrow A in FIG. 2). Due to this rotation of the rotating member 32, the spool 14 (see FIG. 1) is rotated in the take-up direction.

Next, the shape of the pipe 40 will be described in detail. The shape of the pipe 40 is set in consideration of the standpoints of installability, processability, and sliding loss reduction.

As shown in FIG. 3, in the pipe 40, a first corner portion 43, a second corner portion 45, and a third corner portion 47 are formed sequentially from a guide direction upstream side to a guide direction downstream side as a result of an axial direction intermediate portion of the pipe 40 being bent in substantially right angles in three places. Furthermore, in the pipe 40, an intermediate first linear portion 44 that linearly interconnects the first corner portion 43 and the second corner portion 45 and an intermediate second linear portion 46 that linearly interconnects the second corner portion 45 and the third corner portion 47 are formed. Moreover, in the pipe 40, an upstream side linear portion 42 that linearly interconnects the axial direction base end portion 41 and the first corner portion 43 and a downstream side linear portion 48 that configures the guide direction downstream side relative to the third corner portion 47 and extends linearly are formed. The upstream side linear portion 42, the intermediate first linear portion 44, the intermediate second linear portion 46, and the downstream side linear portion 48 are all formed so that their central axes are linear.

In the pipe 40, the first corner portion 43 and the second corner portion 45 are bent in a substantially identical plane (same plane), and the third corner portion 47 is bent in a direction deviating from (separating from) the substantially identical plane. It will be noted that "substantially identical plane" is a concept that includes cases the planes are a physically identical plane and also cases where the planes can be said to be a substantially identical plane. Furthermore, a radius of curvature R1 of the first corner portion 43 shown in FIG. 4A and a radius of curvature R2 of the second corner portion 45 shown in FIG. 4B are, as an example, identically set (same). By contrast, a radius of curvature R3 of the third corner portion 47 shown in FIG. 4C is set larger than the radius of curvature R1 of the first corner portion 43 shown in FIG. 4A and the radius of curvature R2 of the second corner portion 45 shown in FIG. 4B.

In other words, the pipe 40 is bent such that the central axis of the first corner portion 43, the central axis of the second corner portion 45 and the central axis of the intermediate first linear portion 44 which is between the central axis of the first corner portion 43 and the central axis of the second corner portion 45 exist on the substantially identical plane (on the identical plane), and the central axis of the third corner portion 47 does not exist on the substantially identical plane (on the identical plane).

Figure 4A:
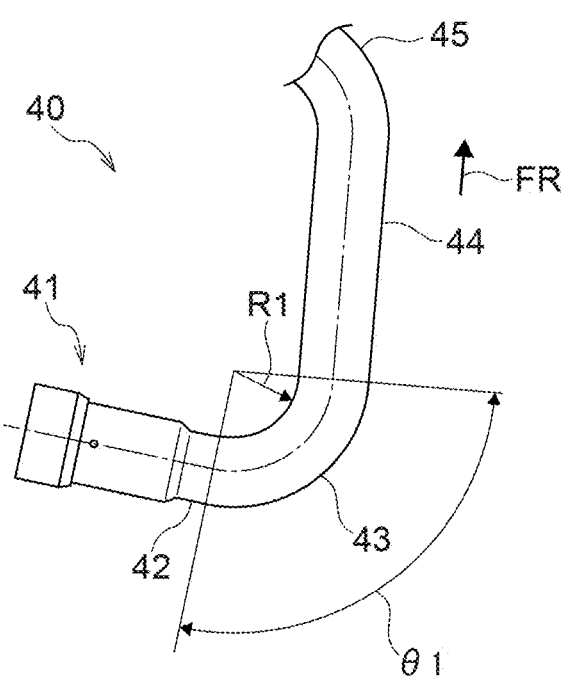
FIG. 4A is a view showing the radius of curvature of a first corner portion.
Figure 4B:
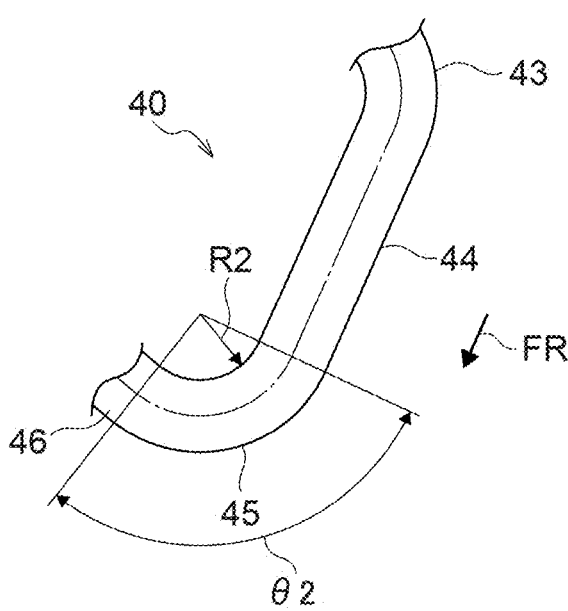
FIG. 4B is a view showing the radius of curvature of a second corner portion.
Figure 4C:
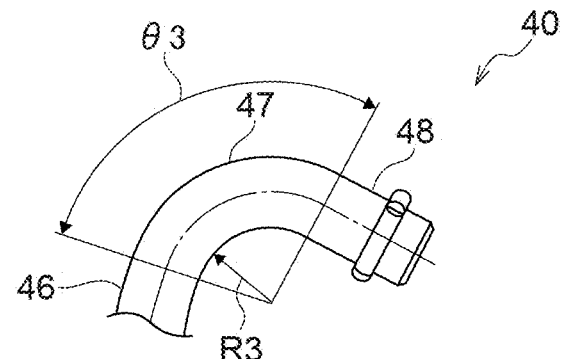
FIG. 4C is a view showing the radius of curvature of a third corner portion.

The relationship between a bend angle θ1 of the first corner portion 43 shown in FIG. 4A, a bend angle θ2 of the second corner portion 45 shown in FIG. 4B, and a bend angle θ3 of the third corner portion 47 shown in FIG. 4C is, as an example, set to θ1<θ3<θ2.

Figure 5:
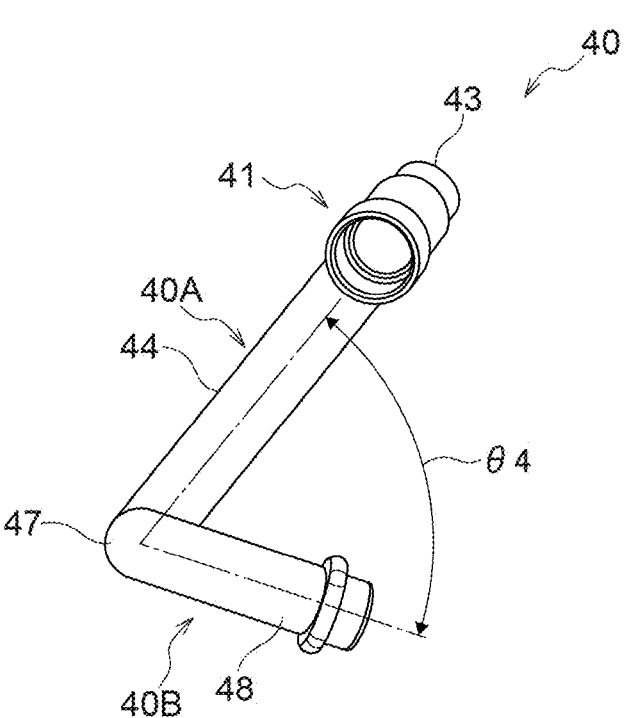
FIG. 5 is a perspective view showing the pipe as viewed in a direction in which the third corner portion and the second corner portion are interconnected.

In FIG. 5 is shown a perspective view of the pipe 40 as viewed in the direction in which the third corner portion 47 and the second corner portion 45 shown in FIG. 3 are interconnected (in other words, as viewed in the axial direction of the intermediate second linear portion 46). As shown in FIG. 5, the pipe 40 is set so that, as viewed in the direction in which the third corner portion 47 and the second corner portion 45 (see FIG. 3) are interconnected, an angle θ4 formed by a first extension portion 40A linearly extending from the first corner portion 43 side to the second corner portion 45 (see FIG. 3) side and a second extension portion 40B linearly extending from the third corner portion 47 side to the guide direction downstream side is an acute angle.

It is preferable that the angle θ4 is set equal to or larger than 30 degrees and equal to or smaller than 85 degrees, it is more preferably that the angle θ4 is set equal to or larger than 50 degrees and equal to or smaller than 80 degrees.

Operation and Effect

Next, the operation and effects of the present embodiment will be described.

In the webbing take-up device 10 shown in FIG. 1, when the MGG 50 (shown in FIG. 3) of the pretensioner 30 is activated by the ECU at the time of a vehicle crush which is one aspect of at the time of a vehicle emergency, high-pressure gas is instantaneously supplied from the MGG 50 to the inside of the pipe 40. When the seal ball 36 is moved to the guide direction downstream side of the pipe 40 by the pressure of the gas, the moving member 34 is pushed by the seal ball 36 and moved to the axial direction distal end side.

When the moving member 34 shown in FIG. 2 is moved to the axial direction distal end side, due thereto, the moving member 34 collides with the teeth 32A of the rotating member 32. Because of this, when the teeth 32A of the rotating member 32 are pushed in the vehicle downward direction by the moving member 34, the rotating member 32 is rotated in the same direction as the take-up direction (the direction of arrow A). Moreover, due to this rotation of the rotating member 32, the teeth 32A of the rotating member 32 stab into the moving member 34 from its outer peripheral surface to its radial direction central side. Then, when the moving member 34 stabbed by the teeth 32A of the rotating member 32 is moved in the vehicle downward direction, due thereto, the rotating member 32 is further rotated. In this way, the rotating member 32 is rotated in the same direction as the take-up direction, and the spool 14 shown in FIG. 1 is rotated in the take-up direction (the direction of arrow A). Because of this, the webbing 16 is taken up onto the spool 14 and the force with which the webbing 16 restrains the occupant is increased.

As shown in FIG. 3 and elsewhere, in the pipe 40, the first corner portion 43, the second corner portion 45, and the third corner portion 47 are formed sequentially from the guide direction upstream side to the guide direction downstream side as a result of the axial direction intermediate portion of the pipe 40 being bent in three places, with the first corner portion 43 and the second corner portion 45 being bent in a substantially identical plane and the third corner portion 47 being bent in a direction deviating from the substantially identical plane. For this reason, in the moving member 34 passing through the third corner portion 47, a portion which is different from the portions bending-deformed (deformed in bending manner) by the first corner portion 43 and the second corner portion 45 becomes bending-deformed.

For example, a part of the moving member 34 which part passes through (contacts) the outermost circumference side inner face of the first corner portion 43 when the moving member 34 passes through the first corner portion 43 is substantially same (is the same) as a part of the moving member 34 which part passes through (contacts) the outermost circumference side inner face of the second corner portion 45 when the moving member 34 passes through the second corner portion 45, but is different from a part of the moving member 34 which part passes through (contacts) the outermost circumference side inner face of the third corner portion 47 when the moving member 34 passes through the third corner portion 47.

For example, a part of the moving member 34 at which part amount of being bending-deformed is the largest when the moving member 34 passing through the first corner portion 43 and a part of the moving member 34 at which part amount of being bending-deformed is the largest when the moving member 34 passing through the second corner portion 45 are different from a part of the moving member 34 at which part amount of being bending-deformed is the largest when the moving member 34 passing through the third corner portion 43.

Here, the radius of curvature R3 of the third corner portion 47 shown in FIG. 4C is set larger than the radius of curvature R1 of the first corner portion 43 shown in FIG. 4A. For this reason, even when there is a portion that becomes newly bending-deformed in the moving member 34 passing through the third corner portion 47 shown in FIG. 3, deceleration of the moving member 34 caused by being bending-deformed of that portion is suppressed because that portion is gently bending-deformed. As a result, sliding loss when the moving member 34 that is elongated and made of resin is guided and moves in the pipe 40 can be reduced. When sliding loss can be reduced in this way, it becomes possible to suppress (reduce) the output by the MGG 50 (see FIG. 3) and a reduction in cost also becomes possible.

Furthermore, the radius of curvature R2 of the second corner portion 45 shown in FIG. 4B is equal to the radius of curvature R1 of the first corner portion 43 shown in FIG. 4A. For this reason, even when a force that pushes part of the moving member 34 against the inner surface of the outer peripheral side of the second corner portion 45 acts due to deceleration of the moving member 34 passing through the third corner portion 47 shown in FIG. 3, sliding resistance is suppressed compared with a case where the radius of curvature (R2) of the second corner portion (45) is set smaller than the radius of curvature (R1) of the first corner portion (43). Moreover, the radius of curvature R3 of the third corner portion 47 shown in FIG. 4C is set larger than the radius of curvature R2 of the second corner portion 45 shown in FIG. 4B. For this reason, deceleration of the moving member 34 passing through the third corner portion 47 shown in FIG. 2 can be efficiently suppressed.

Moreover, in the present embodiment, as shown in FIG. 5, the pipe 40 is set so that, as viewed in the direction in which the third corner portion 47 and the second corner portion 45 (see FIG. 3) are interconnected, the angle θ4 formed by the first extension portion 40A linearly extending from the first corner portion 43 side to the second corner portion 45 (see FIG. 3) side and the second extension portion 40B linearly extending from the third corner portion 47 side to the guide direction downstream side is an acute angle. For this reason, compared with a case where the pipe is set so that the angle formed by the first extension portion (40A) and the second extension portion (40B) is a right angle for example, the amount of the portion that becomes newly bending-deformed in the moving member 34 (see FIG. 2, etc.) passing through the third corner portion 47 can be reduced. Because of this, deceleration of the moving member 34 passing through the third corner portion 47 shown in FIG. 3 can be suppressed even more.

Example Modifications

It will be noted that although in the above embodiment shown in FIG. 1 to FIG. 5 the radius of curvature R1 of the first corner portion 43 (see FIG. 4A) and the radius of curvature R2 of the second corner portion 45 (see FIG. 4B) are identically set, as an example modification of the above embodiment, a configuration where the radius of curvature (R2) of the second corner portion (45) is set larger than the radius of curvature (R1) of the first corner portion (43) can also be employed.

In the above example modification, even when a force that pushes part of the moving member (34) against the inner surface of the outer peripheral side of the second corner portion (45) acts due to deceleration of the moving member (34) passing through the third corner portion (47), sliding resistance caused by that force is suppressed because the force is easily dispersed. As a result, sliding loss when the moving member (34) that is elongated and made of resin is guided and moves in the pipe (40) serving as a guide member can be reduced.

Furthermore, in the example modification where the radius of curvature (R2) of the second corner portion (45) is set larger than the radius of curvature (R1) of the first corner portion (43), a configuration where the radius of curvature (R3) of the third corner portion (47) is set larger than the radius of curvature of the second corner portion (45) can furthermore be employed. In this configuration, deceleration of the moving member (34) passing through the third corner portion (47) can be efficiently suppressed.

It will be noted that in the example modification where the radius of curvature (R2) of the second corner portion (45) is set larger than the radius of curvature (R1) of the first corner portion (43), a configuration where the radius of curvature (R3) of the third corner portion (47) is equal to the radius of curvature (R1) of the first corner portion (43) can also be employed.

Furthermore, as an example modification of the above embodiment, a configuration where the pipe (40) serving as the guide member is set so that, as viewed in the direction in which the third corner portion (47) and the second corner portion (45) are interconnected, the angle (θ4) formed by the first extension portion (40A) and the second extension portion (40B) is a right angle can also be employed.

Furthermore, although in the above embodiment the pipe 40 is provided on the upper portion of the webbing take-up device 10, a configuration where the pipe (40) serving as the guide member is provided for example on a side portion of the webbing take-up device (10) can also be employed.

It will be noted that the above embodiment and the plural example modifications described above may be combined as appropriate and implemented.

An example of the present disclosure has been described above, but the present disclosure is not limited to what is described above and can, in addition to what is described above, of course be modified in various ways and implemented without departing from the spirit thereof.

What is claimed is:

1. A webbing take-up device comprising:
a spool onto which a webbing of a seat belt device is taken up due to the spool being rotated in a take-up direction;
a rotating member that is provided with biting portions, the spool being rotated in the take-up direction due to the rotating member being rotated to one side;
a moving member that is made of resin, that is formed in an elongated shape, and that causes the rotating member to rotate to the one side due to the moving member being moved to a distal end side in an axial direction of the moving member and the biting portions biting the moving member; and
a guide member that is formed in a tubular shape, and that guides movement of the moving member, an intermediate portion in an axial direction of the guide member being bent in three places such that a first corner portion, a second corner portion, and a third corner portion sequentially from an upstream side toward a downstream side in a guide direction are formed,
wherein:
the first corner portion and the second corner portion are bent on a substantially identical plane, and the third corner portion is bent in a direction deviating from the substantially identical plane, and
a radius of curvature of the third corner portion is set larger than a radius of curvature of the first corner portion.

2. The webbing take-up device of claim 1, wherein the radius of curvature of the second corner portion is equal to or larger than the radius of curvature of the first corner portion, and
a radius of curvature of the third corner portion is set larger than the radius of curvature of the second corner portion.

3. The webbing take-up device of claim 2, wherein the guide member is set so that, as viewed in a direction in which the third corner portion and the second corner portion are connected, an angle formed by a first extension portion linearly extending from a first corner portion side to a second corner portion side and a second extension portion linearly extending from a third corner portion side to the downstream side in the guide direction is an acute angle.

4. The webbing take-up device of claim 1, wherein the guide member is set so that, as viewed in a direction in which the third corner portion and the second corner portion are connected, an angle formed by a first extension portion linearly extending from a first corner portion side to a second corner portion side and a second extension portion linearly extending from a third corner portion side to the downstream side in the guide direction is an acute angle.

5. The webbing take-up device of claim 1, wherein the intermediate portion in the axial direction of the guide member is bent in the three places such that a first curved portion is formed at the first corner portion, a second curved portion is formed at the second corner portion, and a third curved portion is formed at the third corner portion, and a radius of curvature of the third curved portion is set larger than a radius of curvature of the first curved portion.

6. A webbing take-up device comprising:

a spool onto which a webbing of a seat belt device is taken up due to the spool being rotated in a take-up direction;

a rotating member that is provided with biting portions, the spool being rotated in the take-up direction due to the rotating member being rotated to one side;

a moving member that is made of resin, that is formed in an elongated shape, and that causes the rotating member to rotate to the one side due to the moving member being moved to a distal end side in an axial direction of the moving member and the biting portions biting the moving member; and a guide member that is formed in a tubular shape, and that guides movement of the moving member, an intermediate portion in an axial direction of the guide member being bent in three places such that a first corner portion, a second corner portion, and a third corner portion sequentially from an upstream side toward a downstream side in a guide direction are formed, wherein:

the first corner portion and the second corner portion are bent on a substantially identical plane, and the third corner portion is bent in a direction deviating from the substantially identical plane, and a radius of curvature of the second corner portion is set larger than a radius of curvature of the first corner portion.

7. The webbing take-up device of claim 6, wherein the guide member is set so that, as viewed in a direction in which the third corner portion and the second corner portion are connected, an angle formed by a first extension portion linearly extending from a first corner portion side to a second corner portion side and a second extension portion linearly extending from a third corner portion side to the downstream side in the guide direction is an acute angle.

8. The webbing take-up device of claim 6, wherein the intermediate portion in the axial direction of the guide member is bent in the three places such that a first curved portion is formed at the first corner portion, a second curved portion is formed at the second corner portion, and a third curved portion is formed at the third corner portion, and a radius of curvature of the second curved portion is set larger than a radius of curvature of the first curved portion.

* * * * *